(12) United States Patent
Chen et al.

(10) Patent No.: US 7,644,473 B2
(45) Date of Patent: Jan. 12, 2010

(54) FOLDABLE HINGE

(75) Inventors: Chia-Hui Chen, Taoyuan (TW);
Tien-Yueh Hsu, Taoyuan (TW)

(73) Assignee: Lianhong Art Co., Ltd., Taoyuan (TW)

( * ) Notice: Subject to any disclaimer, the term of this patent is extended or adjusted under 35 U.S.C. 154(b) by 539 days.

(21) Appl. No.: 11/611,164

(22) Filed: Dec. 15, 2006

(65) Prior Publication Data

US 2007/0169313 A1    Jul. 26, 2007

(30) Foreign Application Priority Data

Dec. 29, 2005    (TW) .............................. 94222941 U (51) Int. Cl.
*E05D 11/08*    (2006.01)

(52) U.S. Cl. .......................................... 16/340; 16/330

(58) Field of Classification Search .................. 16/340, 16/337–339, 341, 327–329, 331, 332; 361/679.06, 361/679.08, 379.12, 679.27; 248/919–923
See application file for complete search history.

(56) References Cited

U.S. PATENT DOCUMENTS

| | | | | |
|---|---|---|---|---|
| 6,666,422 | B1 * | 12/2003 | Lu et al. ................... | 248/291.1 |
| 7,380,313 | B2 * | 6/2008 | Akiyama et al. .............. | 16/367 |
| 7,430,786 | B1 * | 10/2008 | Jian ............................. | 16/330 |
| 2002/0174519 | A1 * | 11/2002 | Huang ......................... | 16/319 |
| 2004/0055114 | A1 * | 3/2004 | Lu ............................... | 16/340 |
| 2004/0093690 | A1 * | 5/2004 | Lu et al. ....................... | 16/330 |
| 2006/0191104 | A1 * | 8/2006 | Cho et al. ..................... | 16/340 |
| 2007/0136995 | A1 * | 6/2007 | Hu et al. ....................... | 16/340 |
| 2007/0151079 | A1 * | 7/2007 | Lu et al. ....................... | 16/337 |
| 2007/0163081 | A1 * | 7/2007 | Lu et al. ....................... | 16/330 |
| 2008/0007906 | A1 * | 1/2008 | Hsu et al. ................... | 361/682 |
| 2008/0034543 | A1 * | 2/2008 | Hsu et al. ..................... | 16/346 |

* cited by examiner

*Primary Examiner*—Chuck Y. Mah
(74) *Attorney, Agent, or Firm*—Ming Chow; Sinorica, LLC (57) ABSTRACT

A foldable hinge comprising: a base seat and a connecting seat able of being adjusted for an included angle between them; an adjusting unit is provided in a pivotally connecting area between the base seat and a pivot connecting unit; the adjusting unit includes a cam being provided with a first slot and a second slot, a positioning member having a protruding bar adapted to extending through the first and second slots, and a press unit able to release engaging of the protruding bar in the first and second slots. When the protruding bar is in the first slot, the connecting seat is adapted to adjusting its depression angle or elevation angle relative to the base seat; when the protruding bar is in the second slot, the base seat and the connecting seat are in a mutual parallel folding state, the protruding bar can be directly extended into the first slot without pressing the press unit.

9 Claims, 9 Drawing Sheets

FOLDABLE HINGE

BACKGROUND OF THE INVENTION

1. Field of the Invention

The present invention relates to a foldable hinge, and especially to a hinge used on a liquid crystal display screen or a TV.

2. Description of the Prior Art

A liquid crystal display screen or a TV has a plane screen, generally is provided at the middle of its bottom edge with a hinge, in order that the screen can be adjusted in the angular range between a depression angle of about 5 degrees and an elevation angle of about 10 degrees.

Generally, such a hinge is composed of a base seat laid horizontally and a vertical connecting seat for mounting the screen, the two seats are connected with each other in a pivotal connecting mode. The base seat is perpendicular to the connecting seat, and if the base seat and the connecting seat are unable to be folded to each other, they will occupy quite a space in transporting and storing, and improvement is wanted.

SUMMARY OF THE INVENTION

The present invention provides an improvement on the conventional hinge which is deficit in its inability of folding, wherein a mechanism is designed for a hinge in order that a base seat and a connecting seat can be folded to each other, this can reduce a space occupied in transporting and storing. And when in mounting, a user needs only to directly unfold the connecting seat away from the base seat without additional process of operation, and thus is extremely convenient in use.

And more, the present invention is provided at a pivotally connecting area where the base seat and the connecting seat are connected with each other with a strengthening member to strengthen the pivotal connecting area.

The present invention will be apparent in its structural features and the effect obtained in operation after reading the detailed description of the preferred embodiment thereof in reference to the accompanying drawings.

DETAILED DESCRIPTION OF THE PREFERRED EMBODIMENT

Figure 1:
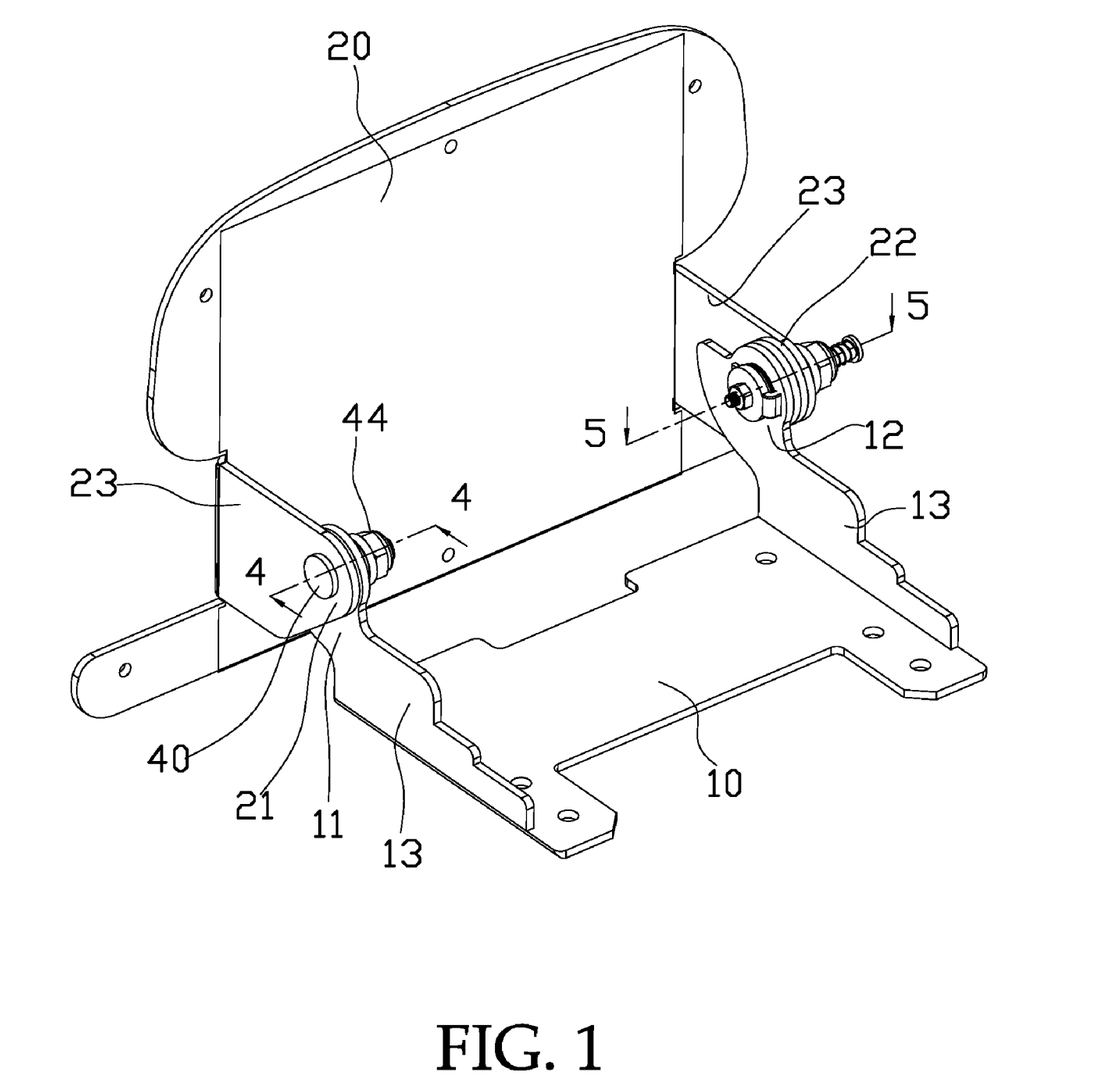
FIG. 1 is a perspective rear view showing the appearance of the present invention, wherein a base seat and a connecting seat are unfolded away from each other to form an unfolding state.
Figure 2:
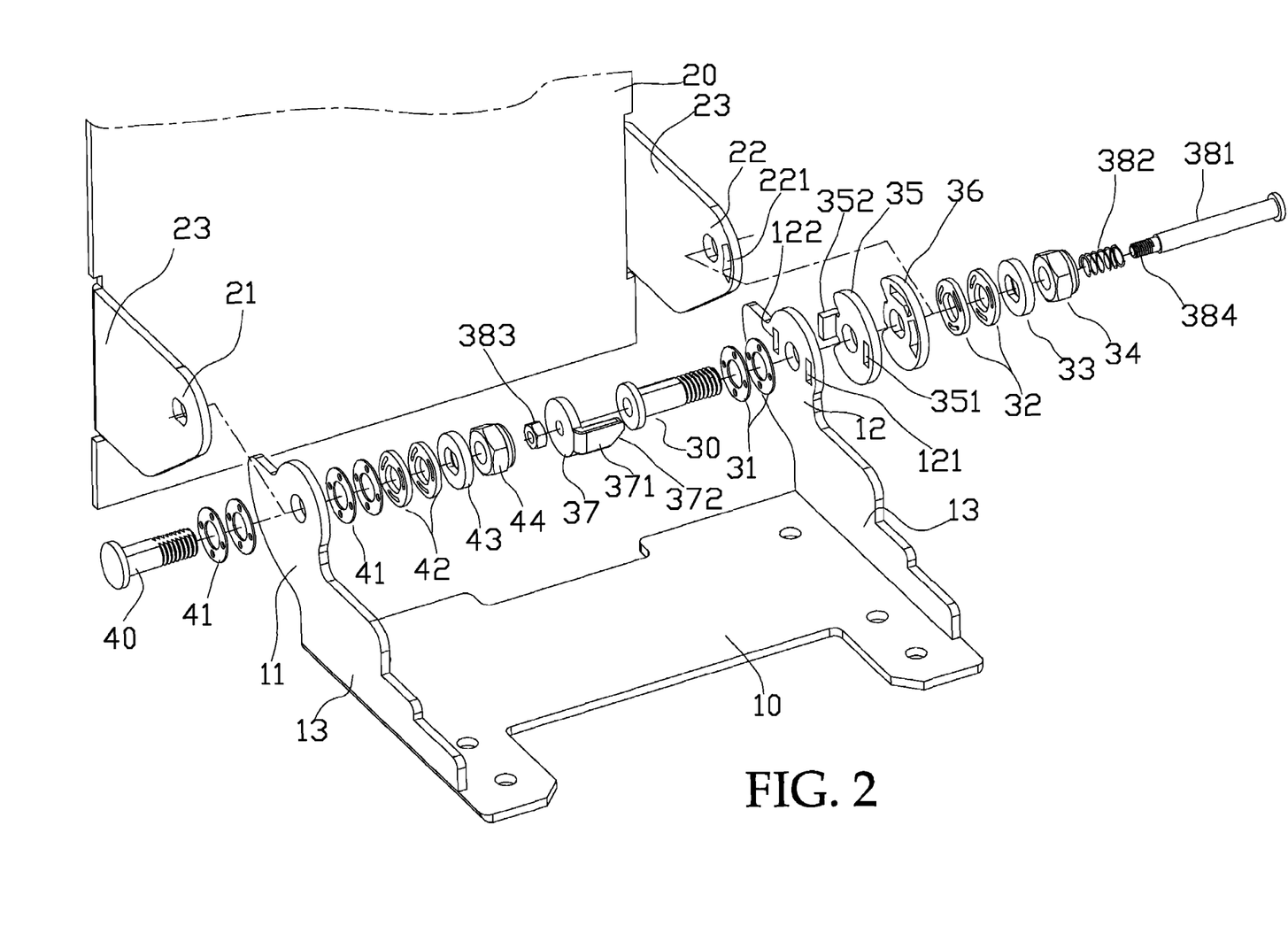
FIG. 2 is an anatomic perspective view of the present invention.
Figure 3:
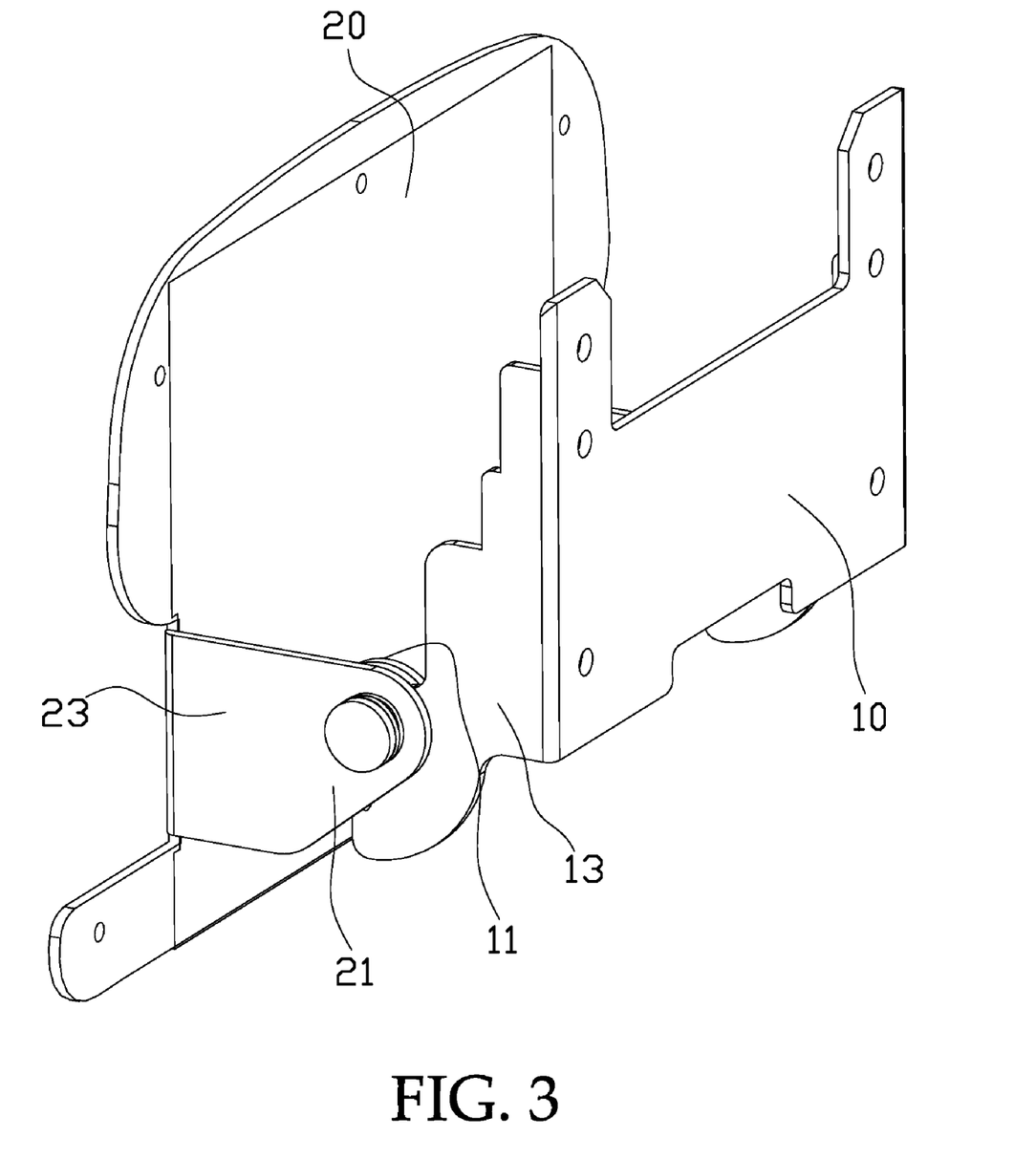
FIG. 3 is a perspective view showing the appearance of the present invention, wherein the base seat and the connecting seat are folded together to form a folding state.

Referring to FIGS. 1-3, a foldable hinge provided by the present invention is composed of a base seat 10 and a connecting seat 20, wherein the connecting seat 20 is mounted on its front side with a plane screen such as a liquid crystal display (LCD) screen, while the base seat 10 at the rear of the connecting seat 20 is connected with a plane. FIG. 1 shows that the base seat 10 and the connecting seat 20 are unfolded away from each other; and FIG. 3 shows that the base seat 10 and the connecting seat 20 are folded together for transporting.

The base seat 10 of the present invention has two lateral plates 13 each having a front end functioning as a seat 11 (12) with a pivot hole, while the connecting seat 20 has two rearward extending plates 23 each having an end also functioning as a seat 21 (22) with a pivot hole; these pivot holes form pivotally connecting areas for pivotally connecting two pivot connecting units.

Figure 4:
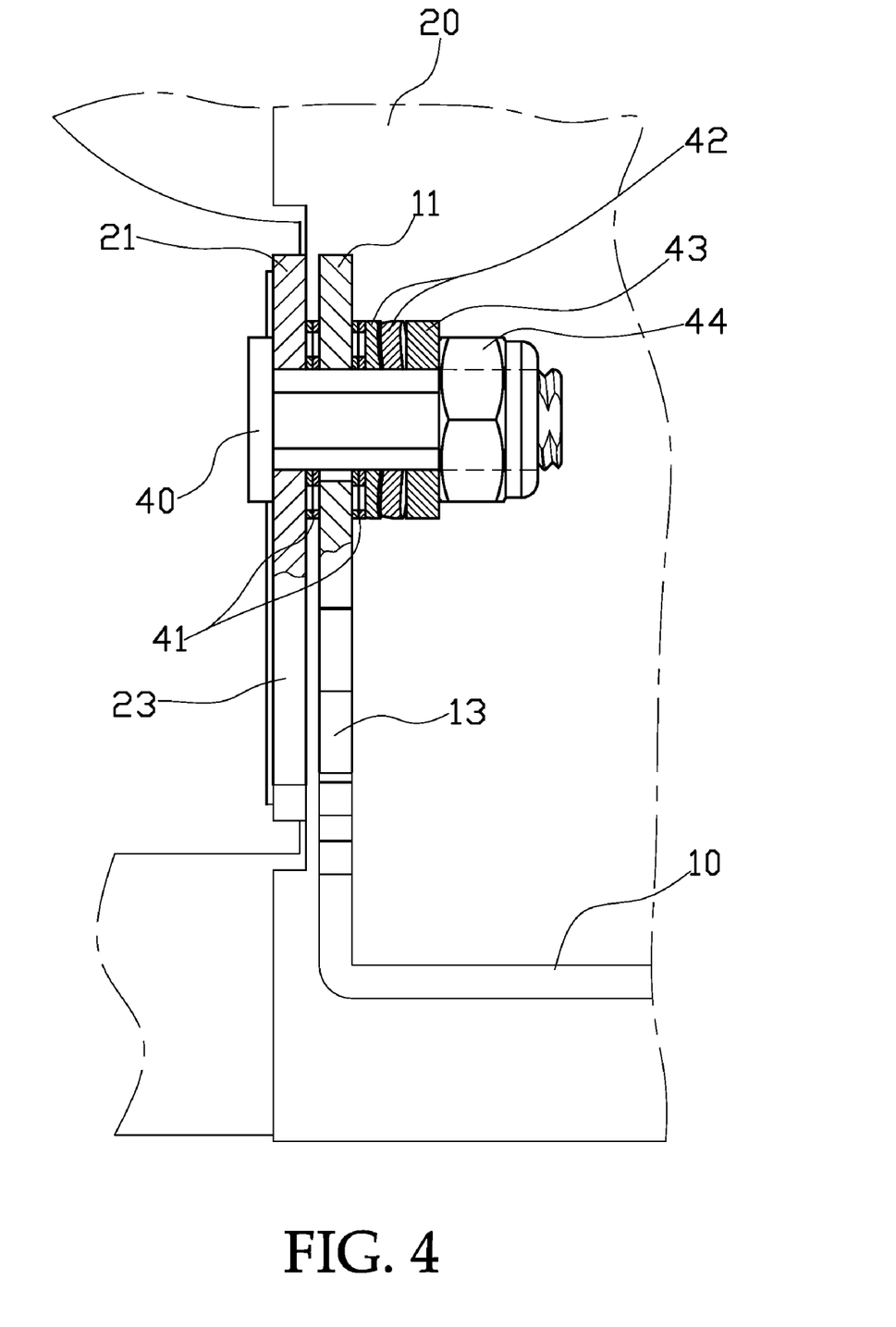
FIG. 4 is a sectional view taken from a sectional line 4-4 in FIG. 1.

The pivotally connecting area on the left side is extended therethrough by a bolt 40 which extends through a plurality of washers 41, the seats 11, 21, a plurality of spring washers 42 and a gasket 43 and is screw connected with a nut 44, thus a pivot connecting unit is formed as shown in FIG. 4. By a pressure force provided by the spring washers 42, the seat 21 of the connecting seat 20 can be rotated relatively to the seat 11 of the base seat 10 and can be positioned at any angular position.

The pivotally connecting area on the right side is extended therethrough by a bolt 30 which extends through a plurality of washers 31, the seats 12, 22, a plurality of spring washers 32 and a gasket 33 and is screw connected with a nut 34, thus a pivot connecting unit is formed; the pivotally connecting area further has an adjusting unit that is composed of a strengthening member 35 and a cam 36 provided between the seat 12 with a pivot hole of the base seat 10 and the seat 22 with a pivot hole of the connecting seat 20, and a positioning member 37 provided at the inner end of the bolt 30. At this area, there further is a press unit that includes a press rod 381 of the hollow bolt 30, a spring 382 and a nut 383 provided on the inner side of the positioning member 37, wherein a threaded portion 384 on an inner tailing end of the press rod 381 is screw connected with the nut 383 after the press rod 381 is extended through the spring 382, the hollow bolt 30 and the positioning member 37. With this structure, an outer end of the press rod 381 can move the positioning member 37 at the inner end of the hollow bolt 30 as are shown in FIGS. 5 and 6.

Figure 9:
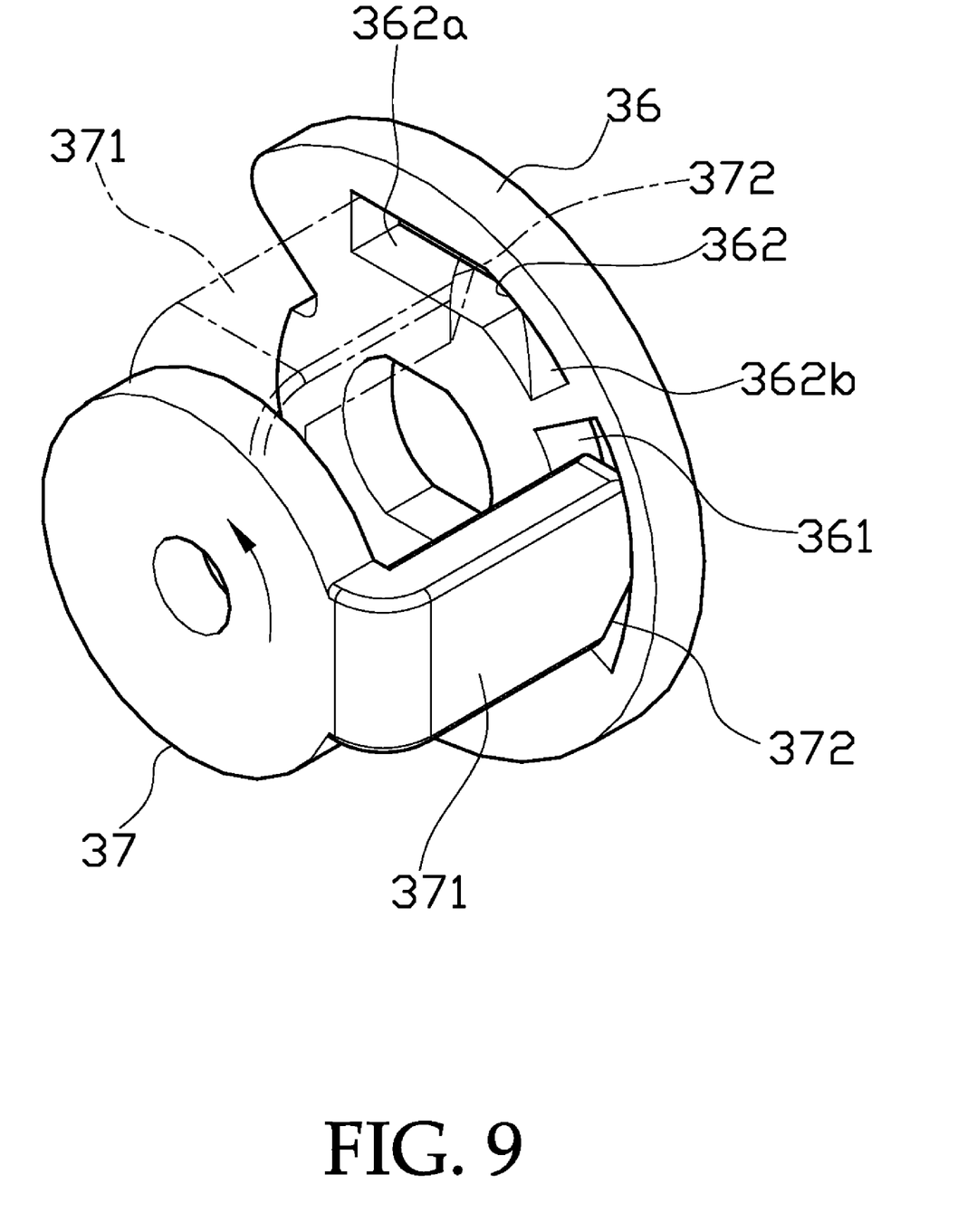
FIG. 9 is a schematic perspective view showing operation of assembling of a positioning member with the cam.

The cam 36 in the adjusting unit is provided with a first slot 361 and a second slot 362; the positioning member 37 has a protruding bar 371 with a bevel portion 372 on its one end, and is adapted to extending through an opening 121 on the seat 12 of the base seat 10 and an opening 351 on the strengthening member 35, and then extending through the first and second slots 361, 362 of the cam 36, such as is shown in FIG. 9 which only shows the cam 36 and the positioning member 37 to make clear of the relationship between the two. When the protruding bar 371 of the positioning member 37 is extended through the first slot 361 as is shown in FIG. 5, it will further be extended through an opening 221 on the seat 22 of the connecting seat 20 to unfold the connecting seat 20 away from the base seat 10 and to position the connecting seat 20.

Figure 7:
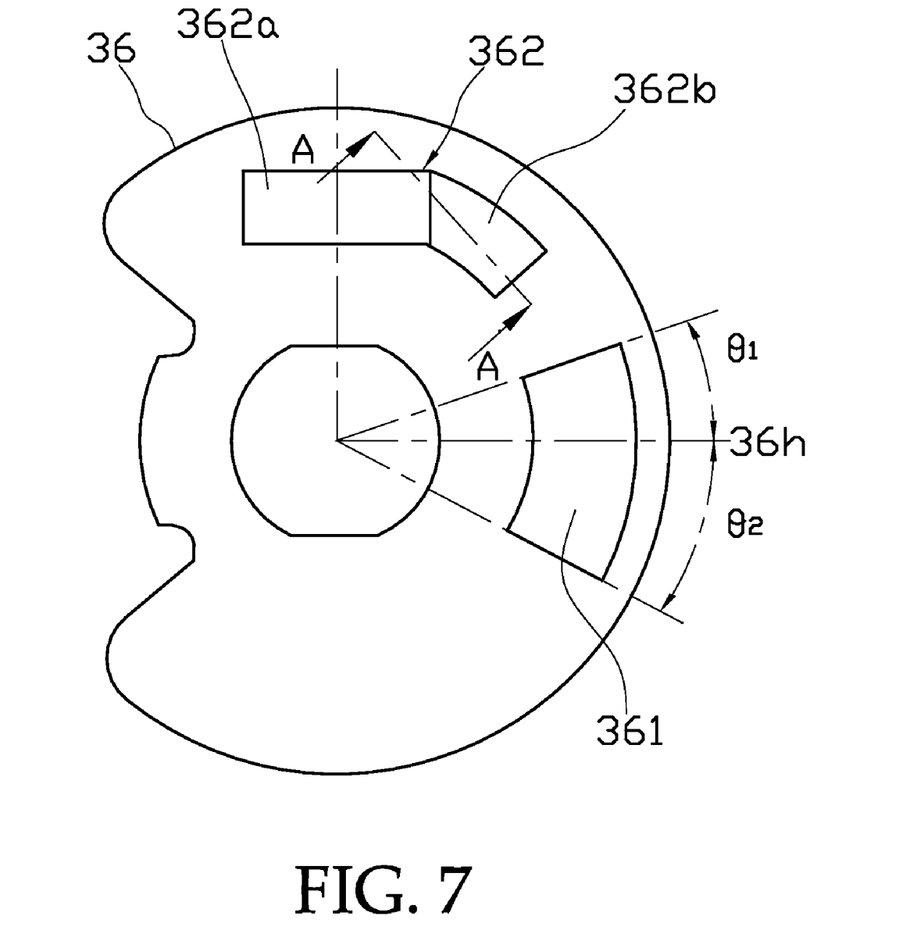
FIG. 7 is a plan view showing a cam of the present invention.
Figure 7A:
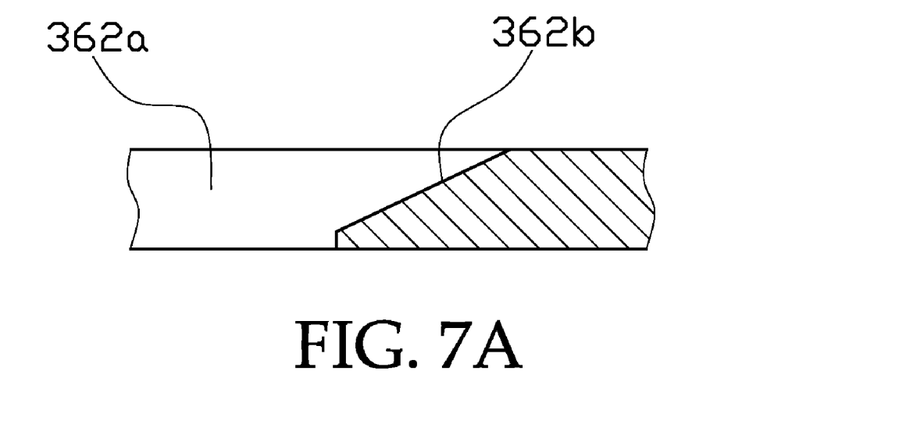
FIG. 7A is a sectional view taken from a sectional line A-A in FIG. 7.
Figure 8:
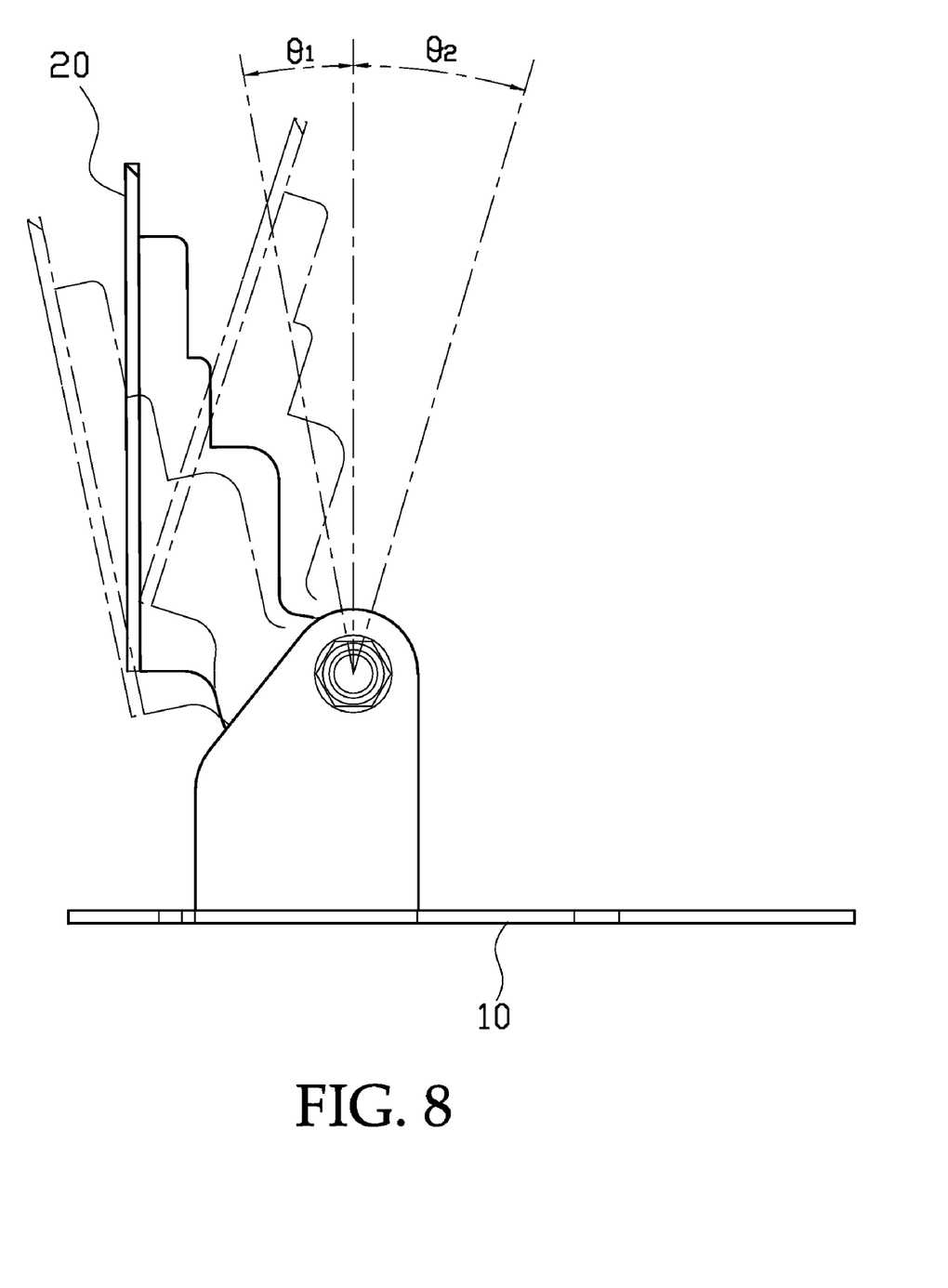
FIG. 8 is a schematic view showing operation of adjusting depression angle and elevation angle.

Referring to FIGS. 7 and 7A, the first slot 361 of the cam 36 has a diameter 36h in a horizontal direction, a first angle θ1 is formed on the upper portion as a depression angle, and a second angle θ2 is formed on the lower portion as an elevation angle for adjusting of the connecting seat 20 such as is shown in FIG. 8; and as stated in the Description of the Prior Art in the BACKGROUND OF THE INVENTION, the depression angle θ1 is about 5 degrees and the elevation angle θ2 is about 10 degrees (as shown in FIG. 8, the technique is same as the conventional one).

Figure 5:
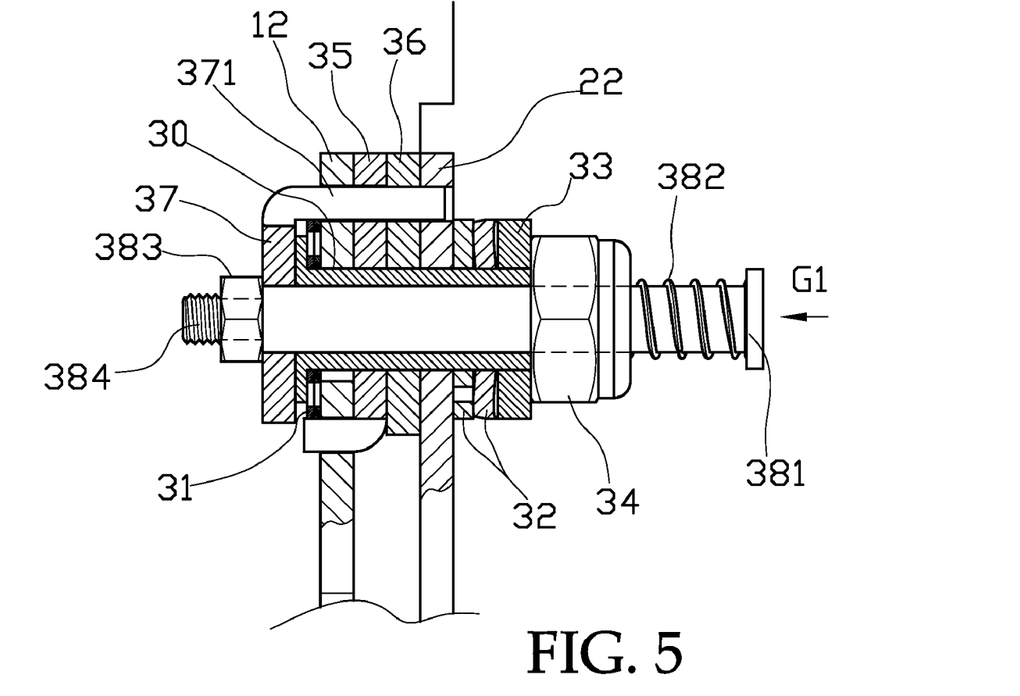
FIG. 5 is a sectional view taken from a sectional line 5-5 in FIG. 1.
Figure 6:
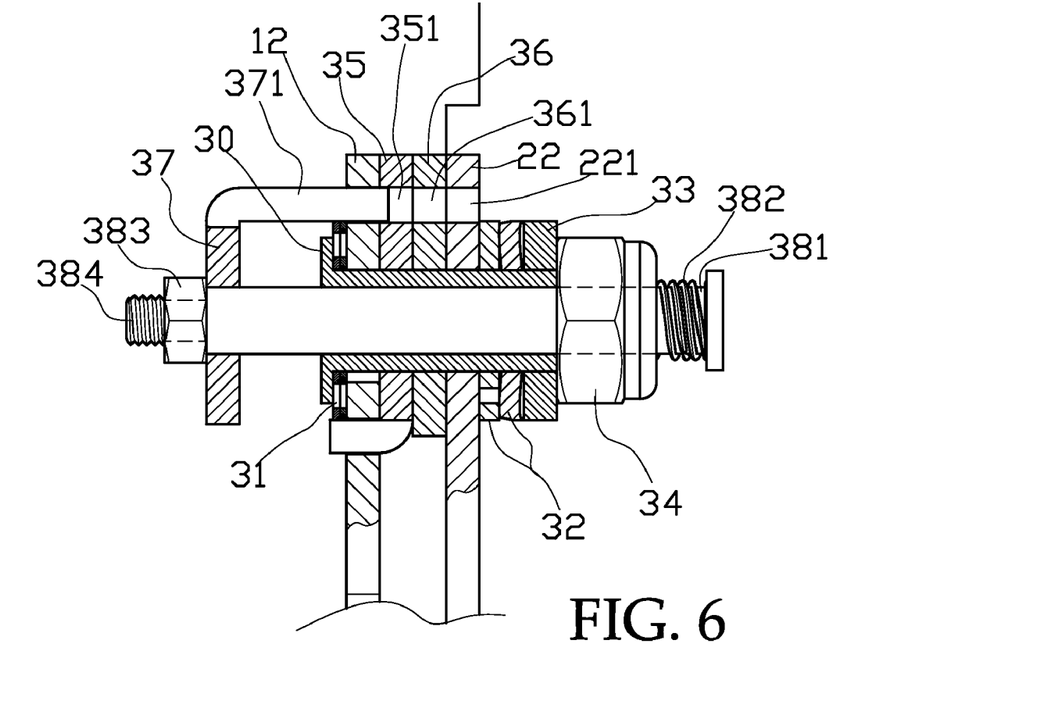
FIG. 6 is a schematic sectional view showing operation of a press unit in FIG. 5.

When the base seat 10 and the connecting seat 20 are folded to each other to form the state as shown in FIG. 3, the press rod 381 can be exerted on its end with a pressure in the direction as shown by an arrow G1 in FIG. 5, the press rod 381 thus is retracted to compress the spring 382 as shown in FIG. 6, thereby the protruding bar 371 of the positioning member 37 is released from engaging with the opening 221 on the seat 22 and the first slot 361 of the cam 36; accordingly, the base seat 10 can be rotated relatively to the connecting seat 20 to the folded position as shown in FIG. 3 to make the protruding bar 371 of the positioning member 37 aligned exactly with the second slot 362 of the cam 36; now if the pressure exerted by the press rod 381 is released, by the restoring force of the spring 382, the protruding bar 371 of the positioning member 37 is engaged in the second slot 362 of the cam 36.

Referring to FIGS. 7 and 7A again, the second slot 362 of the cam 36 contains a stop section 362a and a slope section 362b, wherein the stop section 362a will position the base seat 10 in the folded state to be unable to move when the protruding bar 371 of the positioning member 37 is extended through the stop section 362a, this can be benefit to transporting. However, if the connecting seat 20 and the base seat 10 are unfolded away from each other, it needs only to pull the connecting seat 20 to make the bevel portion 372 on one end of the protruding bar 371 of the positioning member 37 (please refer to the dot and dash line in FIG. 9) slide along the slope section 362b, so that the protruding bar 371 can be directly extended into the first slot 361 of the cam 36 without pressing the press rod 381, and the connecting seat 20 can be adjusted to move to an unfolding position relative to the base seat 10.

Evidently, in the foldable hinge provided by the present invention, the connecting seat 20 and the base seat 10 are very easy to unfold and collapse in operation, adjustment of the depression angle and the elevation angle of the connecting seat 20 is more convenient than those of the prior art.

And more, the present invention can be provided between the cam 36 and the seat 12 with a strengthening member 35 which has an engaging piece 352 to be engaged in another opening 122 to complete assembling. By contact of the strengthening member 35 with the cam 36, a function of stopping can be formed to reduce the rate of damage of the seat 12 having a pivot hole.

Figure 10:
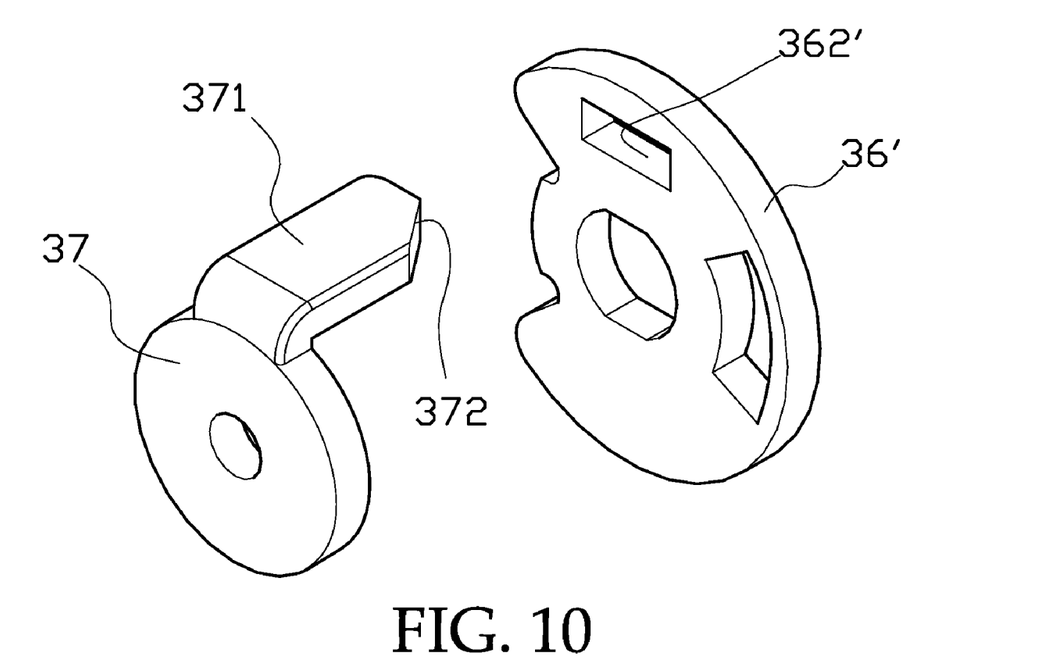
FIG. 10 is a perspective view showing another kind of combination of a positioning member with the cam.

And further to referring to FIG. 10, in which a second slot 362' of a cam 36' only has a stop section 362a but no slope section 362b; it needs only to use the bevel portion 372 on one end of the protruding bar 371 of the positioning member 37, the connecting seat 20 can be adjusted directly to move to an unfolding position relative to the base seat 10 without pressing the press rod 381. The advantage of such designing is resided in saving the process of manufacturing of the slope section 362b in the second slot 362' of the cam 36'.

Figure 11:
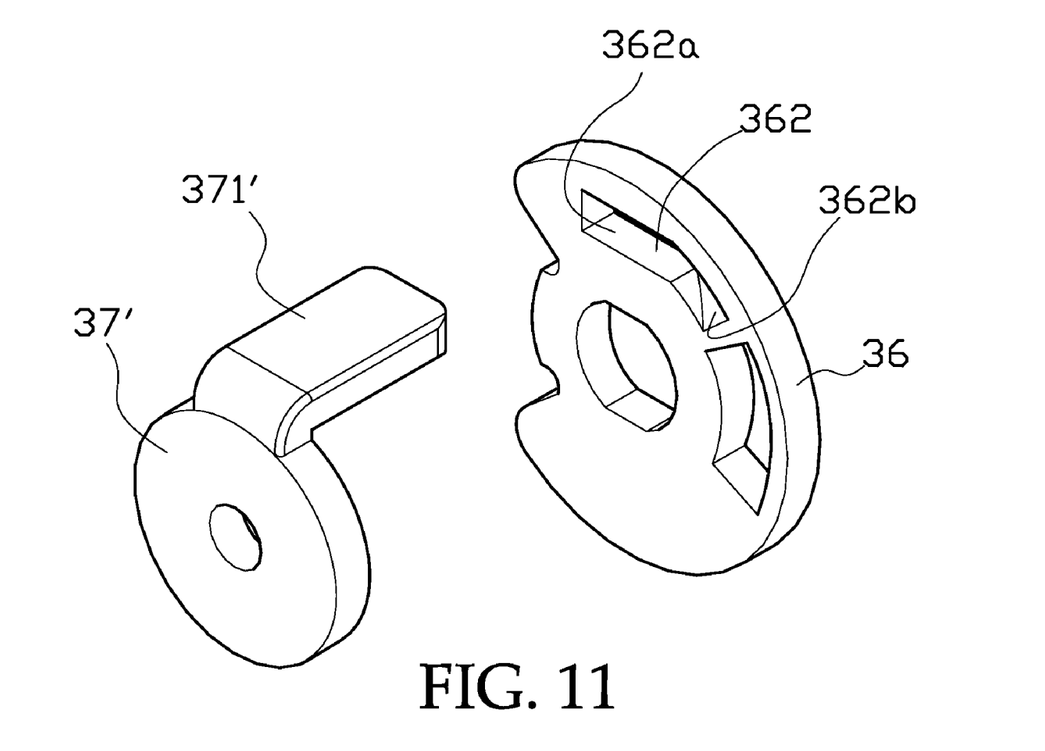
FIG. 11 is a perspective view showing another kind of combination of a positioning member with the cam.

Surely, referring to FIG. 11, in which one end of a protruding bar 371' of a positioning member 37' does not have the bevel portion 372; it needs only to use the slope section 362b in the second slot 362 of the cam 36, the connecting seat 20 can be adjusted directly to move to an unfolding position relative to the base seat 10 without pressing the press rod 381.

What are stated in the specification and shown in the drawings are only for illustrating the preferred embodiments of the present invention, and not for giving any limitation to the scope of the present invention. The scope of protection for this invention is defined by the appended claims of this invention.

The invention claimed is:

1. A foldable hinge comprising:
   a base seat being fixed on a plane, having two lateral plates each having a seat with a pivot hole forming a pivotally connecting area;
   a connecting seat for fixing a plane screen, having two rearward extending plates each having a seat with a pivot hole forming another pivotally connecting area;
   two pivot connecting units used for pivotally connecting said base seat with said connecting seat;
   an adjusting unit is composed of a cam provided between said seat with a pivot hole of said base seat and said seat with a pivot hole of said connecting seat as well as a positioning member provided at an inner end of said pivot connecting unit having said adjusting unit;
   said cam is provided with a first slot and a second slot;
   said positioning member has a protruding bar with a bevel portion on its one end, and is adapted to extend through said seat with a pivot hole of said base seat;
   said positioning member has a protruding bar with a bevel portion on its one end, and is adapted to extend through said seat with a pivot hole of said base seat, said seat with a pivot hole of said connecting seat, and said first and second slots of said cam;
   the adjusting unit provided in one of said two pivot connecting units, hence when said base seat and said connecting seat are unfolded away from each other, said connecting seat is rotated to adjust its depression angle or elevation angle relative to said base seat, said adjusting unit is adapted to folding said base seat and said connecting seat together, and said adjusting unit is adapted to directly unfolding said connecting seat away from said base seat to form an unfolding state; and
   a press unit provided in said pivot connecting unit having said adjusting unit, said press unit is changed from said unfolding state into a folding state;
   when said protruding bar is in said first slot of said cam, said base seat and said connecting seat are in said unfolding state, and said connecting seat is adapted to adjusting its depression angle or elevation angle relative to said base seat; when said protruding bar is in said second slot of said cam, said base seat and said connecting seat are in said folding state.

2. The foldable hinge as claimed in claim 1, wherein said second slot of said cam contains a stop section and a slope section, when said protruding bar of said positioning member is in said stop section, said base seat and said connecting seat are folded to each other to form said folding state; and when said adjusting unit unfolds said connecting seat away from said base seat to form said unfolding state, said bevel portion on said one end of said protruding bar is adapted to sliding out of said second slot from said slope section and entering said first slot to form said unfolding state.

3. The foldable hinge as claimed in claim 1, wherein said press unit has at least a press rod, when said press rod is exerted with a force, said protruding bar of said positioning member is released from engaging with said first slot of said cam; accordingly, said base seat is rotated to fold relatively to said connecting seat to form said folding state.

4. The foldable hinge as claimed in claim 3, wherein said press unit further has a spring, when a pressure exerted by said press rod is released, said press rod gets a restoring force.

5. The foldable hinge as claimed in claim 4, wherein a threaded portion is provided on an inner tailing end of said press rod of said press unit, said threaded portion is screw connected with a nut for fixing said positioning member 6. The foldable hinge as claimed in claim 1, wherein a strengthening member is provided between said seat with a pivot hole of said base seat and said adjusting unit to form a stopping function to reduce rate of damage of said seat with a pivot hole of said base seat.

7. The foldable hinge as claimed in claim 6, wherein said strengthening member has an engaging piece to be engaged in an opening of said seat with a pivot hole of said base seat.

8. The foldable hinge as claimed in claim 1, wherein said two pivot connecting units each is extended therethrough by a bolt which extends serially through a plurality of washers, said seats each with a pivot hole, a plurality of spring washers and a gasket and is screw connected with a nut.

9. The foldable hinge as claimed in claim 1, wherein said adjusting unit includes a cam provided between said seat with a pivot hole of said base seat and said seat with a pivot hole of said connecting seat, and a positioning member provided at an inner end of said pivot connecting unit having said adjusting unit;

said cam is provided at least with a first slot and a second slot;

said second slot contains a stop section and a slope section;

said positioning member has a protruding bar, and is adapted to extending through said seat with a pivot hole of said base seats;

said seat with a pivot hole of said connecting seat;

said pivot connecting unit having said adjusting unit and said first and second slots of said cam;

when said protruding bar is in said first slot of said cam, said base seat and said connecting seat are in said unfolding state, thus said connecting seat is adapted to adjusting its depression angle or elevation angle relative to said base seat; when said protruding bar is in said second slot of said cam, said base seat and said connecting seat are in said folding state; and when said adjusting unit directly unfolds said connecting seat away from said base seat to form said unfolding state, said protruding bar is adapted to sliding out of said second slot from said slope section and entering said first slot to form said unfolding state.

\* \* \* \* \*